(12) United States Patent
Yamamoto et al.

(10) Patent No.: US 10,801,170 B2
(45) Date of Patent: Oct. 13, 2020

(54) MAGNETIC MARKER AND MARKER SYSTEM

(71) Applicant: Aichi Steel Corporation, Tokai-shi (JP)

(72) Inventors: Michiharu Yamamoto, Tokai (JP); Tomohiko Nagao, Tokai (JP); Hitoshi Aoyama, Tokai (JP)

(73) Assignee: AICHI STEEL CORPORATION, Tokai (JP)

( * ) Notice: Subject to any disclaimer, the term of this patent is extended or adjusted under 35 U.S.C. 154(b) by 0 days.

(21) Appl. No.: 16/309,990

(22) PCT Filed: Jun. 13, 2017

(86) PCT No.: PCT/JP2017/021858
§ 371 (c)(1),
(2) Date: Dec. 14, 2018

(87) PCT Pub. No.: WO2017/217423
PCT Pub. Date: Dec. 21, 2017

(65) Prior Publication Data
US 2019/0194886 A1 Jun. 27, 2019

(30) Foreign Application Priority Data

Jun. 17, 2016 (JP) .................. 2016-120905

(51) Int. Cl.
*E01F 11/00* (2006.01)
*G05D 1/02* (2020.01)
(Continued)

(52) U.S. Cl.
CPC ............ *E01F 11/00* (2013.01); *E01F 9/30* (2016.02); *G05D 1/02* (2013.01); *G08G 1/042* (2013.01); *G05D 2201/0213* (2013.01)

(58) Field of Classification Search
CPC ...................................................... E01F 11/00
(Continued)

(56) References Cited

U.S. PATENT DOCUMENTS 1,791,997 A * 2/1931 Benton ................. E01F 13/105
246/128
1,803,292 A * 4/1931 Adler, Jr. ............... G08G 1/042
340/905

(Continued)

FOREIGN PATENT DOCUMENTS

JP 6-142132 A 5/1994
JP H11 168007 A 6/1999
(Continued)

OTHER PUBLICATIONS

English-language translation of International Search Report and Written Opinion for International Application No. PCT/JP2017/021858, dated Aug. 29, 2017.
(Continued)

*Primary Examiner* — Qutbuddin Ghulamali
(74) *Attorney, Agent, or Firm* — Xsensus LLP

(57) ABSTRACT

A magnetic marker (1), laid in or on a road so as be detectable by a magnetic sensor (2) attached to a bottom surface side of a vehicle (5), that is used for vehicle-side drive assist control for assisting driving is an isotropic ferrite plastic magnet, molded into a columnar shape, that contains a magnetic powder of iron oxide, i.e. a powder of a magnetic material, dispersed in a polymer material. In a marker system (1S) including this magnetic marker (1), magnetic markers (1) accommodated in holes (530) bored in a road surface (53) are arranged along the center of a lane.

20 Claims, 18 Drawing Sheets

(51) Int. Cl.
*E01F 9/30* (2016.01)
*G08G 1/042* (2006.01)

(58) Field of Classification Search
USPC .......................................................... 340/933
See application file for complete search history.

(56) References Cited

U.S. PATENT DOCUMENTS

| | | | | |
|---|---|---|---|---|
| 3,609,678 | A * | 9/1971 | Fayling | G05D 1/0261 340/905 |
| 5,408,179 | A * | 4/1995 | Sampey | G01V 3/087 324/253 |
| 5,853,846 | A * | 12/1998 | Clark | B32B 5/16 428/131 |
| 6,468,678 | B1 * | 10/2002 | Dahlin | E01F 9/30 180/167 |
| 2002/0149493 | A1 * | 10/2002 | Yudate | E01F 9/30 340/693.5 |

FOREIGN PATENT DOCUMENTS

| | | |
|---|---|---|
| JP | H11 272327 A | 10/1999 |
| JP | 2000-089825 A | 3/2000 |
| JP | 2001-109990 A | 4/2001 |
| JP | 2001-125638 A | 5/2001 |
| JP | 2002-169614 A | 6/2002 |
| JP | 2002-260154 A | 9/2002 |
| JP | 2003-027432 A | 1/2003 |
| JP | 2003-119710 A | 4/2003 |
| JP | 2004-342083 A | 12/2004 |
| JP | 2005-202478 A | 7/2005 |
| JP | 2008-502041 A | 1/2008 |
| JP | 4655247 B2 | 3/2011 |
| JP | 2012-154786 A | 8/2012 |
| JP | 2013-242299 A | 12/2013 |
| WO | 2005/019851 A1 | 3/2005 |
| WO | 2006/000690 A1 | 1/2006 |
| WO | 2009/078296 A1 | 6/2009 |
| WO | 2009/119081 A1 | 10/2009 |
| WO | 2011/155527 A1 | 12/2011 |
| WO | 2015/167013 A1 | 11/2015 |

OTHER PUBLICATIONS

Extended European Search Report dated Apr. 23, 2020, issued in corresponding European Patent Application No. 17813319.5.

* cited by examiner

[FIG. 1]
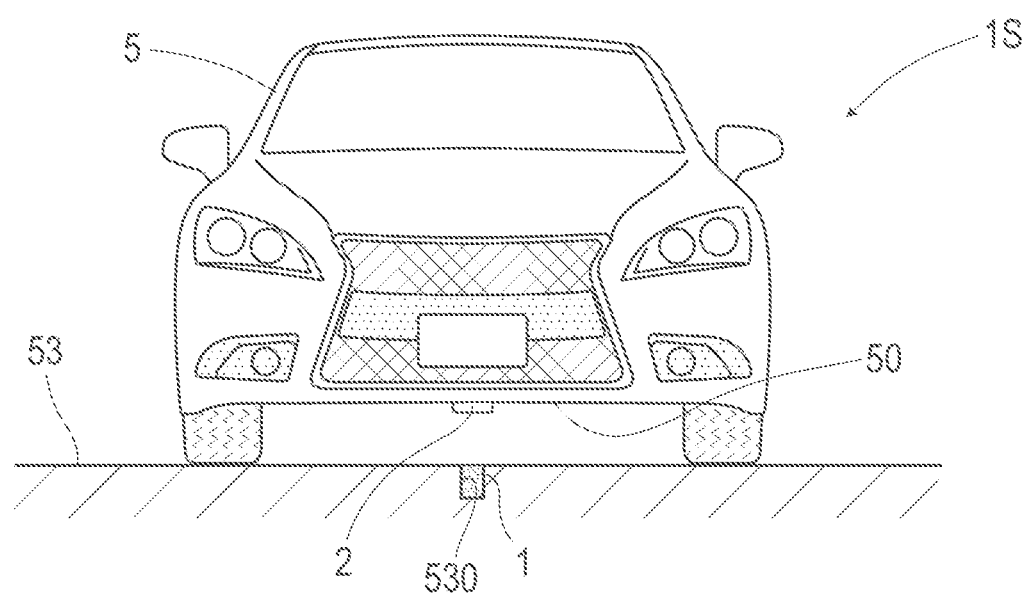

[FIG. 2]
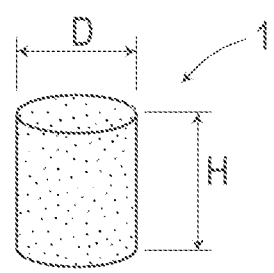

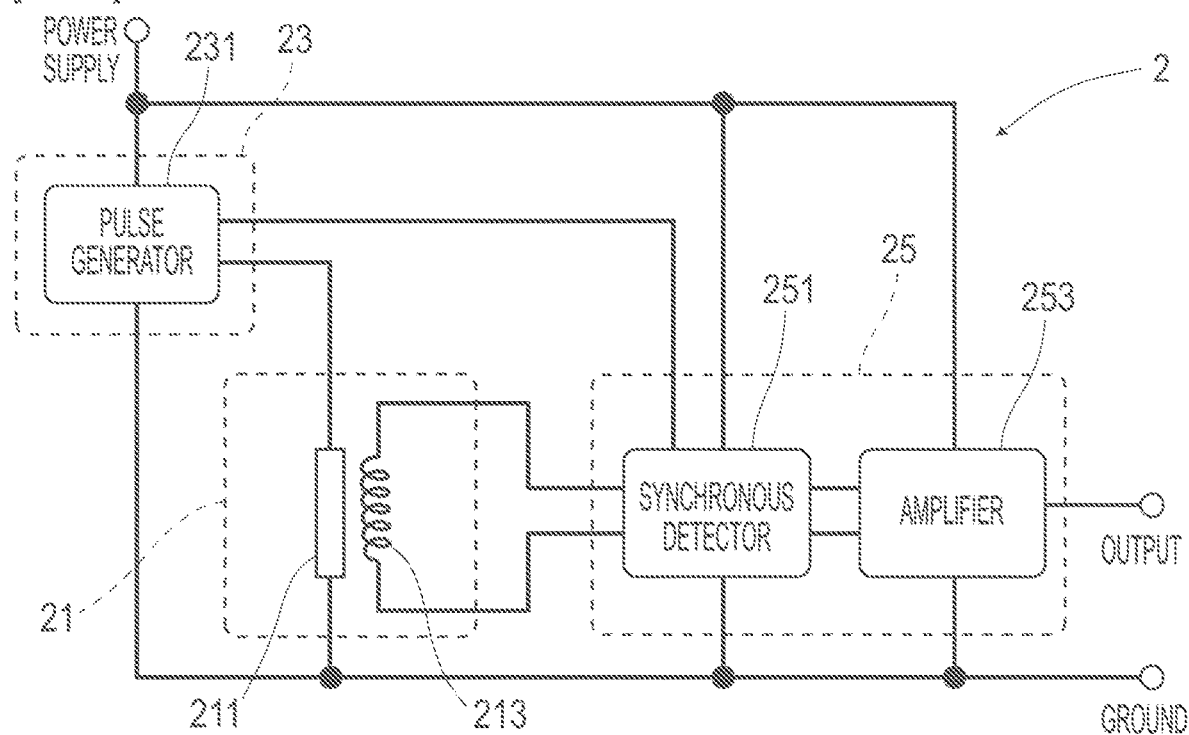

[FIG. 4]
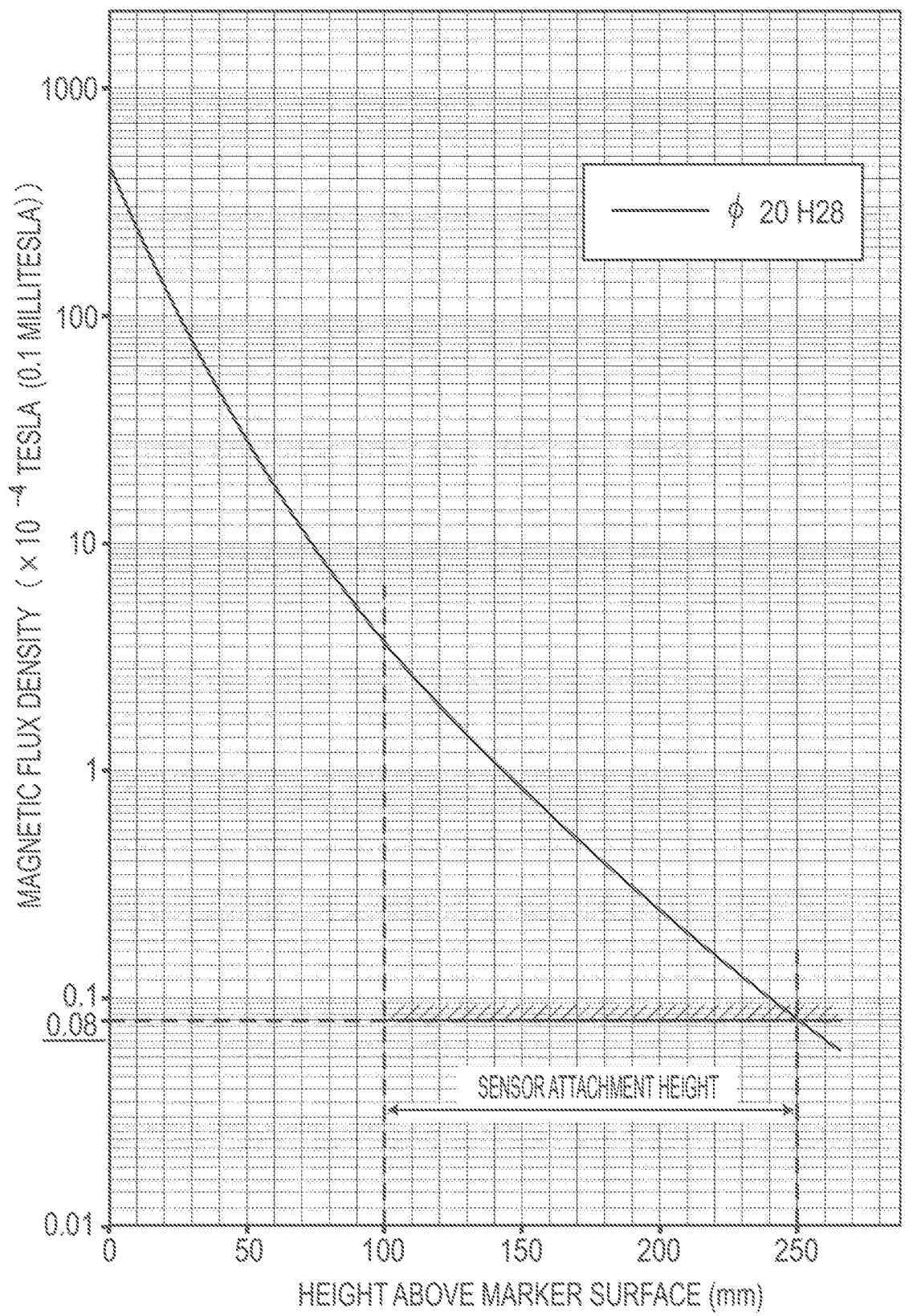

[FIG. 5]
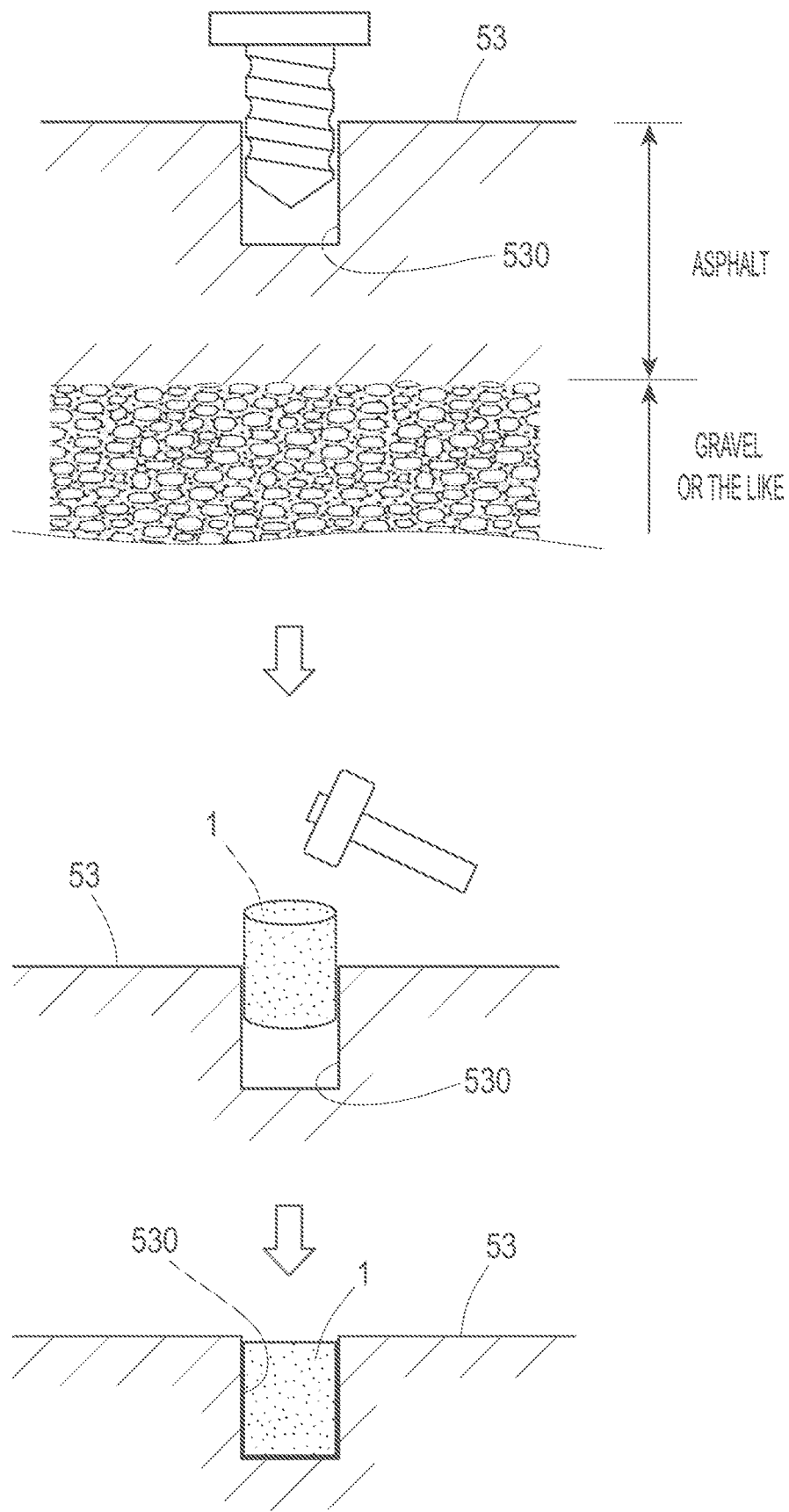

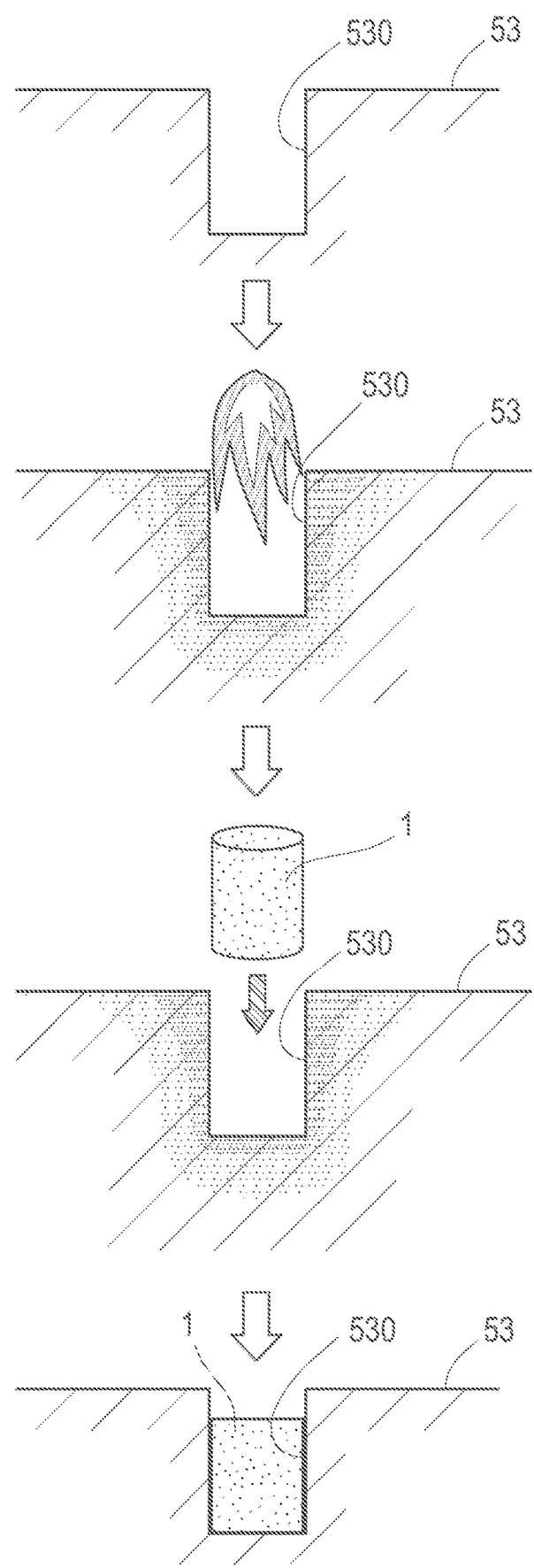
[FIG. 6]

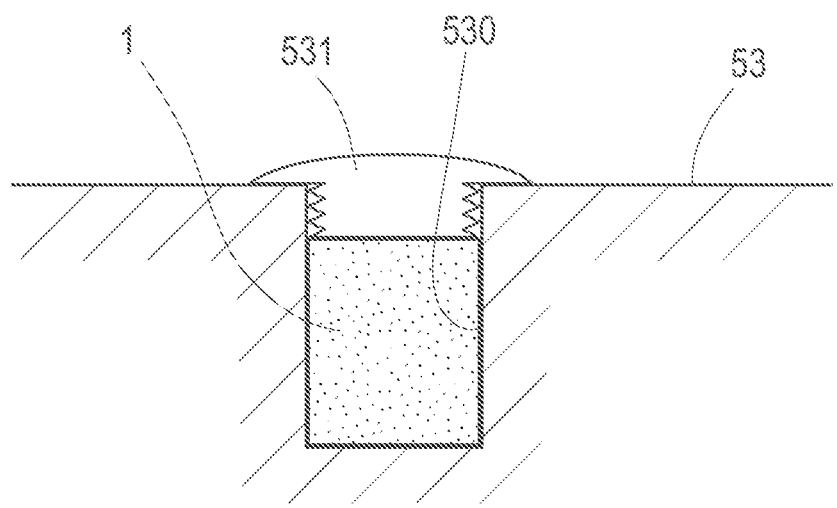
[FIG. 7]

[FIG. 8]
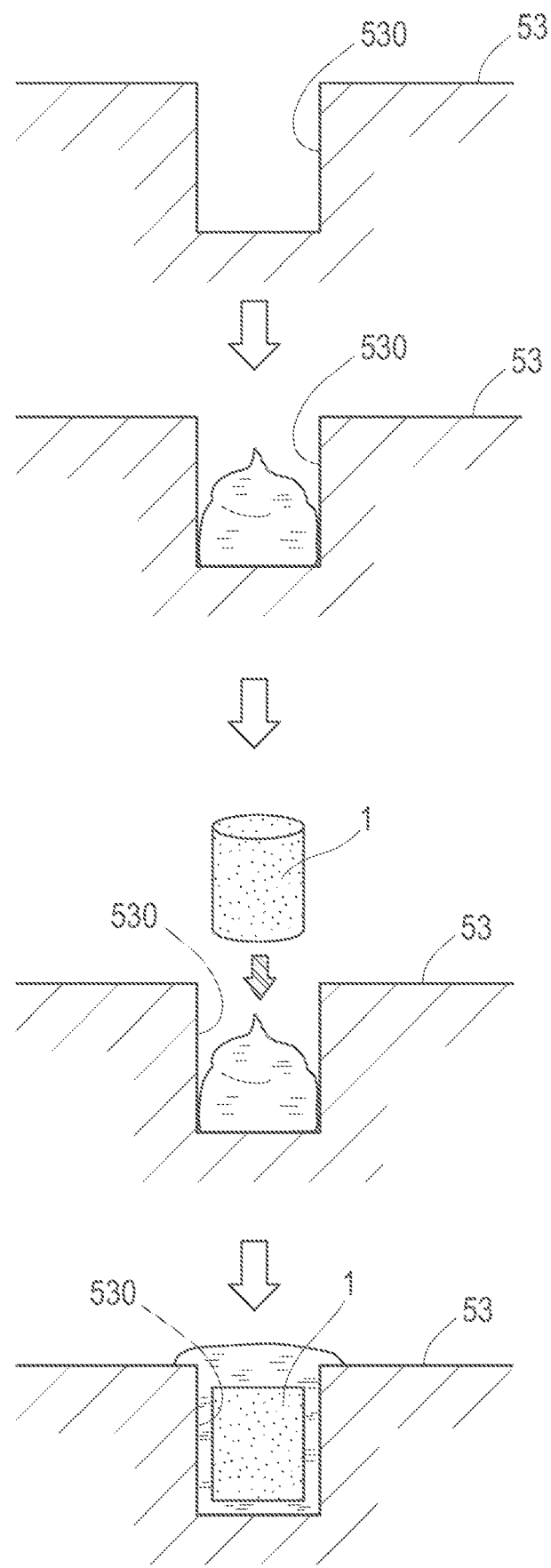

[FIG. 9]
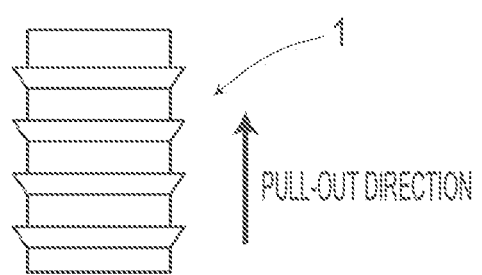

[FIG. 10]
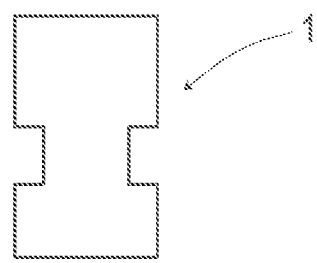

[FIG. 11]
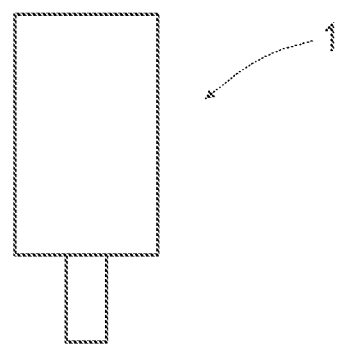

[FIG. 12]
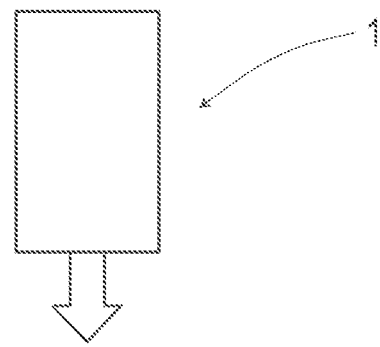

[FIG. 13]
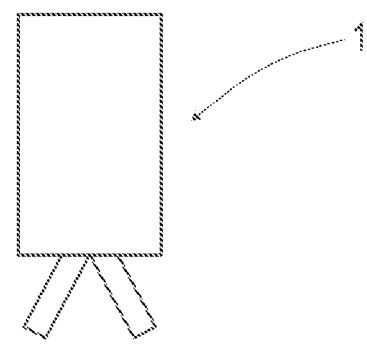

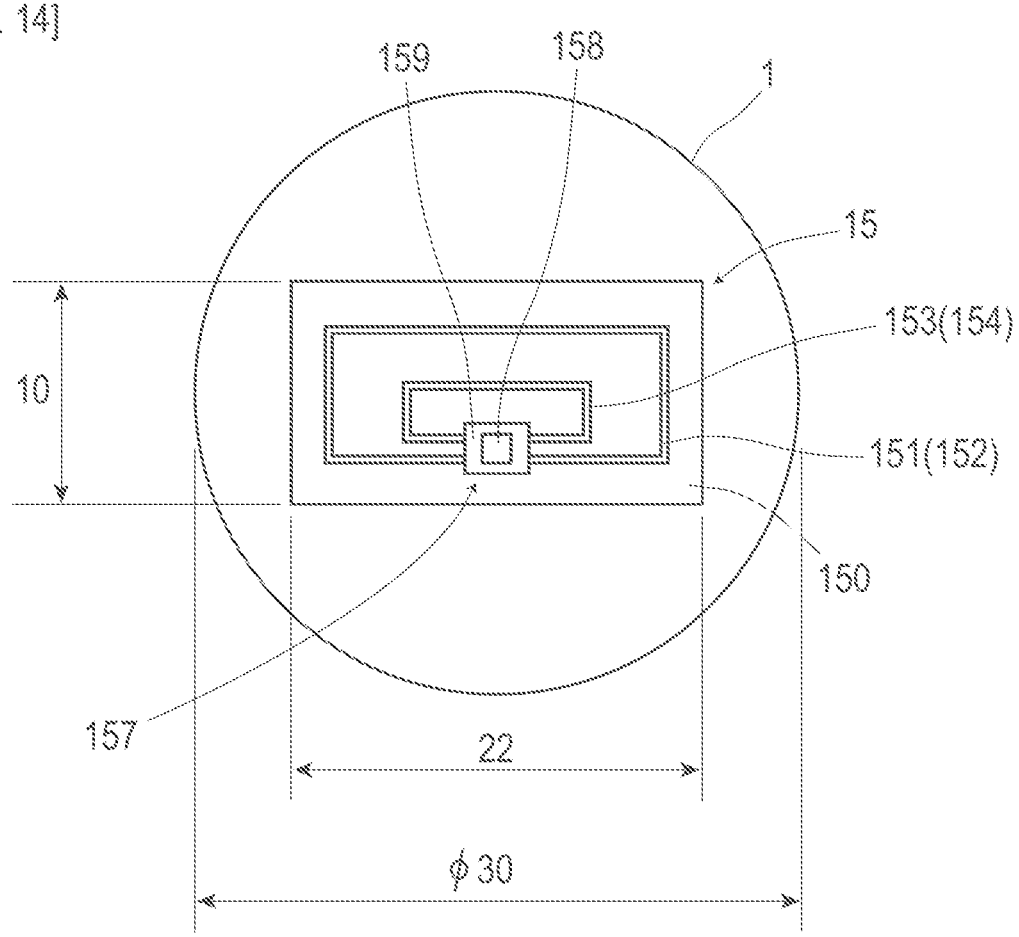

[FIG. 15]
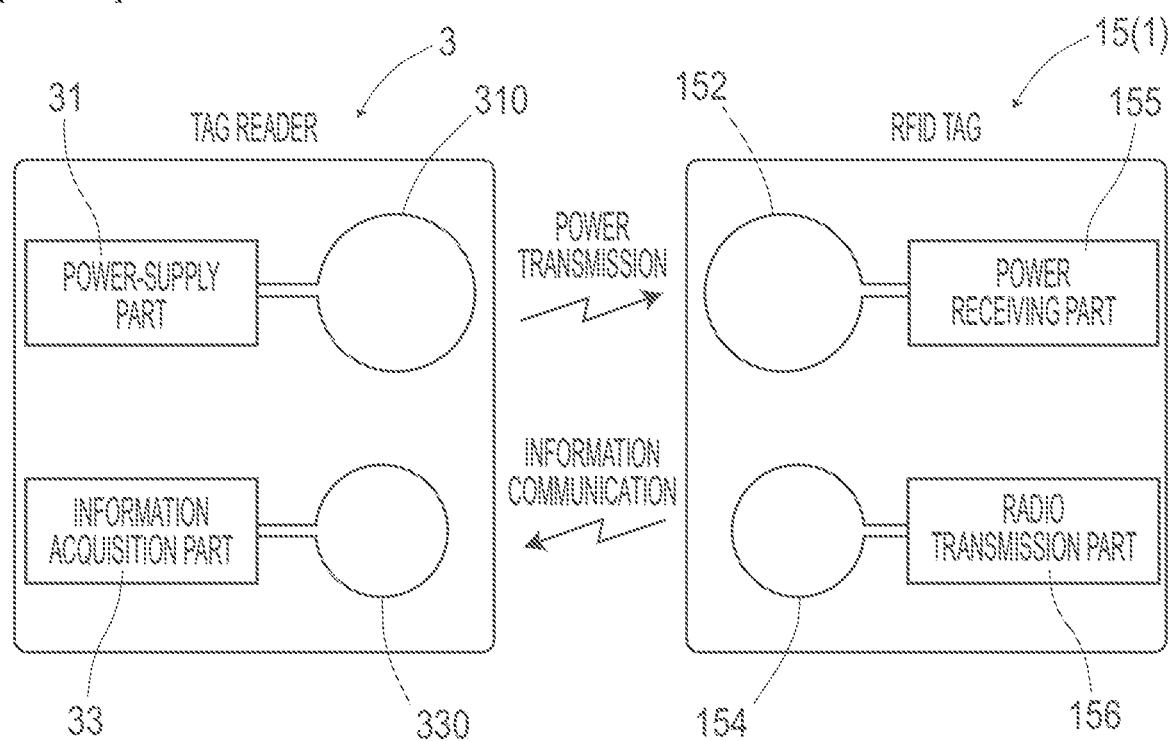

[FIG. 16]
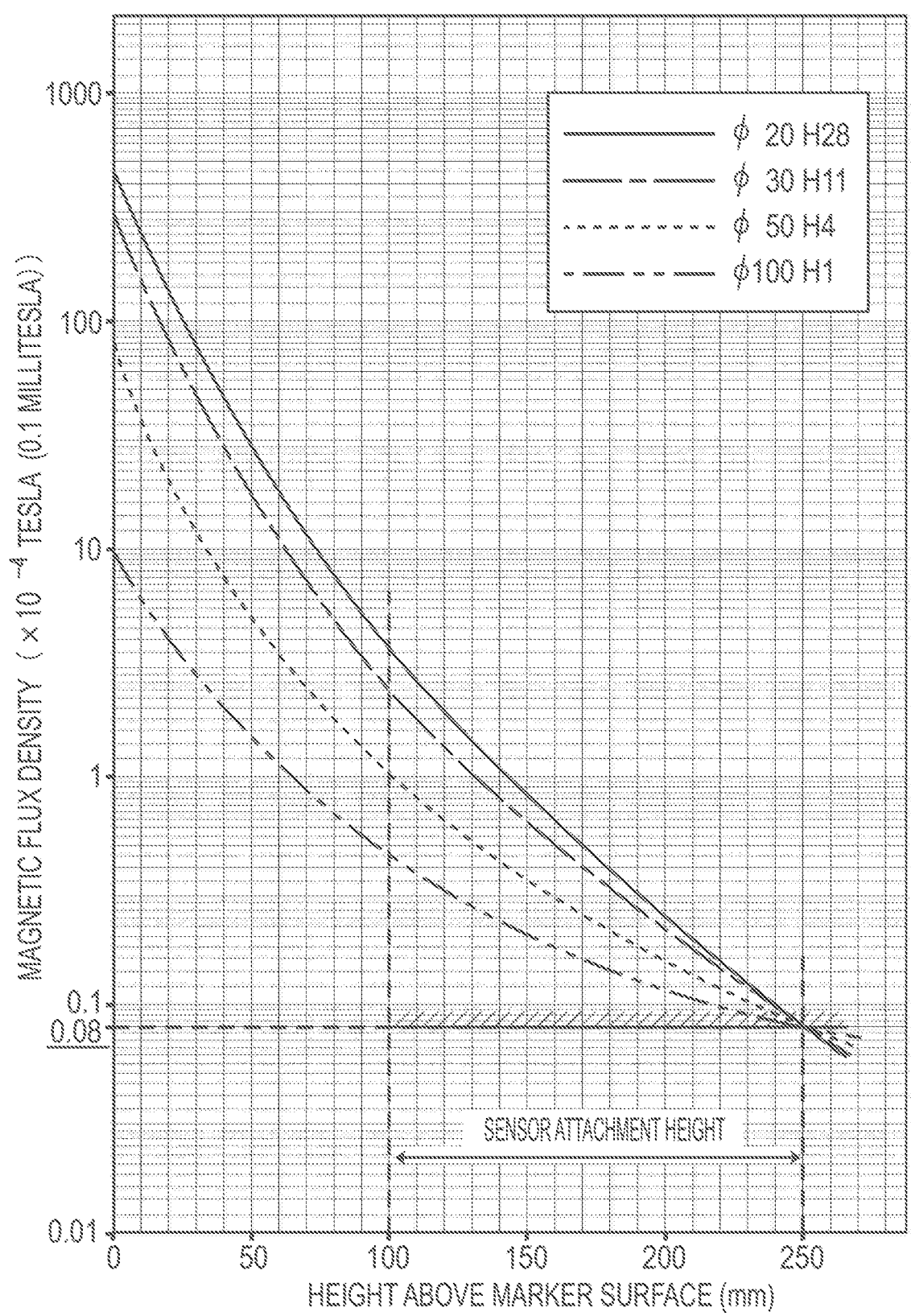

[FIG. 17]
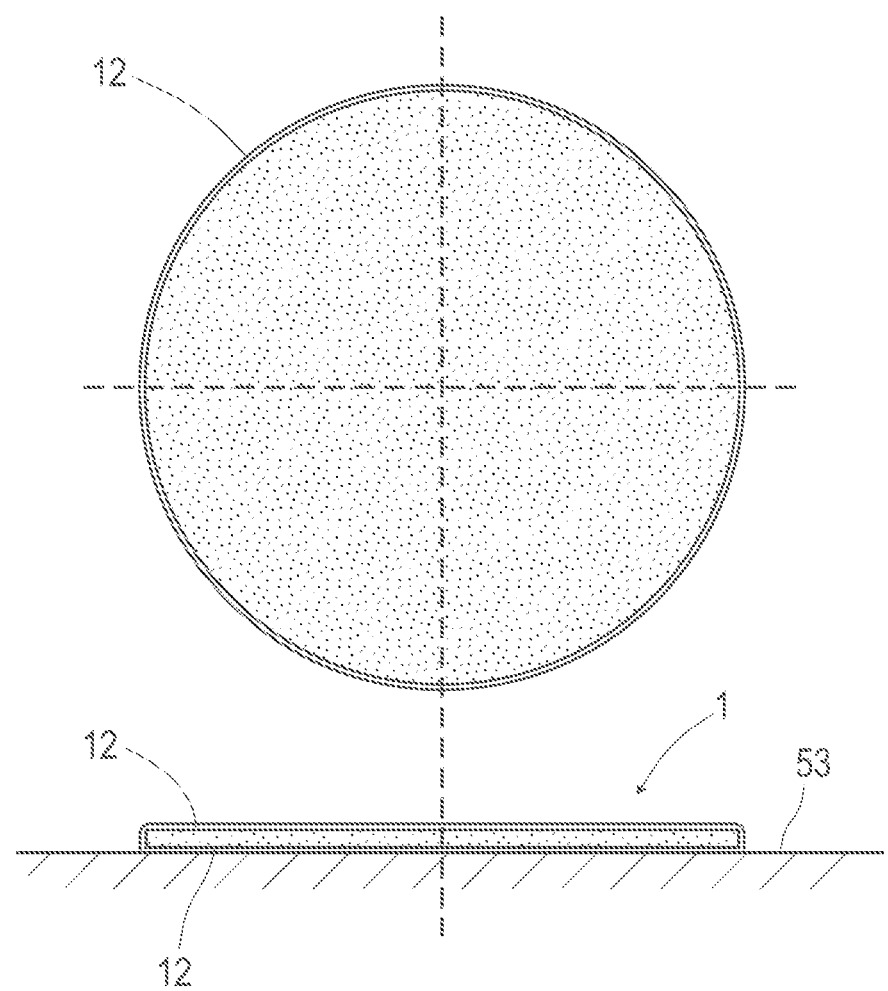

[FIG. 18]
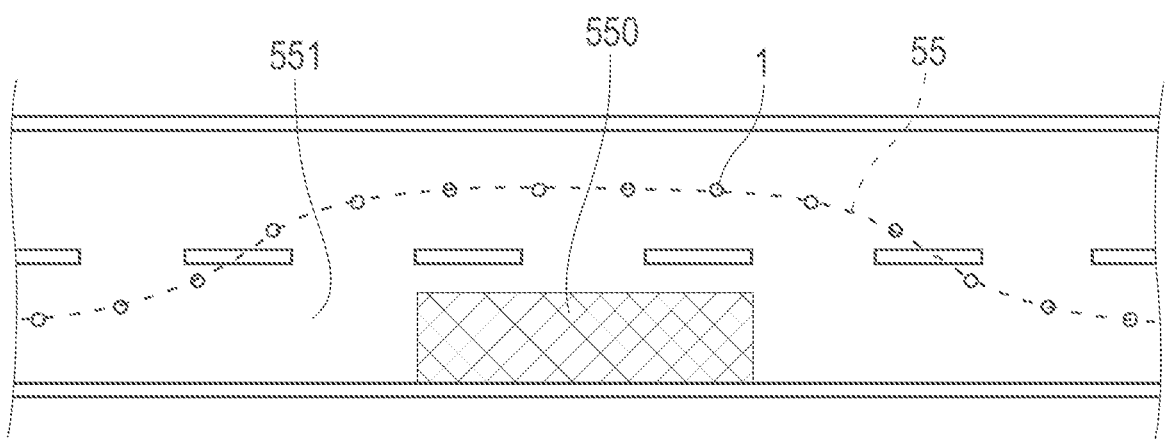

MAGNETIC MARKER AND MARKER SYSTEM

CROSS-REFERENCE TO RELATED APPLICATIONS

This application is a National Stage Application based on PCT/JP2017/021858, filed on 13 Jun. 2017, and claims priority to Japanese Patent Application No. 2016-120905, filed on 17 Jun. 2016, the entire contents of which being incorporated herein by reference.

TECHNICAL FIELD

The present invention relates to a magnetic marker that is laid in or on a road and a marker system including a magnetic marker.

BACKGROUND ART

Conventionally, there has been known a marker system having a magnetic marker laid in or on a road so as to be detectable on a vehicle side (see, for example Patent Literature 1). Such a marker system is intended to achieve various types of drive assist such as automatic steering control, lane departure warning, and automatic driving with use of magnetic markers laid along lanes.

On the vehicle side, a magnetic sensor is attached at a comparatively high position of approximately 100 to 250 mm above a road surface. For higher reliability of detection of the magnetic marker, the magnetic marker needs to generate a stronger magnetic field, and there has been proposed a magnetic marker employing a magnet, such as neodymium, that generates a strong magnetic force (see, for example, Patent Literature 2).

CITATION LIST

Patent Literature

Patent Literature 1: JP 2005-202478
Patent Literature 2: JP 2003-027432

SUMMARY OF INVENTION

Technical Problem

However, the conventional magnetic marker and the conventional marker system have the following problem. That is, since a magnet such as neodymium is susceptible to oxidation, it needs to be accommodated, for example, in a highly-airtight, highly-durable metallic case. This easily causes a rise in cost and an increase in size of a magnetic marker per se. Furthermore, an increase in size of a magnetic marker undesirably induces a rise in installation cost.

The present invention was made in view of the above-described conventional problem to provide a magnetic marker and a marker system at reduced cost.

Solution to Problem

A first aspect of the present invention is directed to a magnetic marker, laid in or on a road so as to be detectable by a magnetic sensor of a vehicle, that is used for vehicle-side drive assist control for assisting driving, including: a magnet, molded into a columnar shape, that contains a magnetic powder that is a powder of a magnetic material.

A second aspect of the present invention is directed to a marker system, including a magnetic marker laid in or on a road so as to be detectable by a magnetic sensor of a vehicle, that is used for vehicle-side drive assist control for assisting driving, including the columnar magnetic marker according to the first aspect.

Advantageous Effects of Invention

A magnetic marker according to the present invention is a magnet, molded into a columnar shape, that contains a magnetic powder that is a power of a magnetic material. For example, a magnetic marker that is not a magnet accommodated in a metallic case or the like but a magnet per se has a small number of components and makes it easy to reduce cost. Further, a magnetic marker that is a magnet per se can be configured to be comparatively small in size, thus making it possible to reduce installation cost at the time of laying.

As noted above, the magnetic marker and the marker system according to the present invention are both low in cost.

BRIEF DESCRIPTION OF DRAWINGS

FIG. 1 is a descriptive diagram of a marker system according to Embodiment 1;
FIG. 2 is a diagram depicting a magnetic marker according to Embodiment 1;
FIG. 3 is a block diagram depicting an electrical configuration of a magnetic sensor according to Embodiment 1;
FIG. 4 is a graph depicting a magnetic field distribution of the magnetic marker in a vertical direction according to Embodiment 1;
FIG. 5 is a descriptive diagram of a procedure for laying work according to Embodiment 2;
FIG. 6 is a descriptive diagram of another procedure for laying work according to Embodiment 2;
FIG. 7 is a diagram depicting a laid state of the magnetic marker according to Embodiment 2;
FIG. 8 is a descriptive diagram of another procedure for laying work according to Embodiment 2;
FIG. 9 is a diagram depicting another magnetic marker according to Embodiment 2;
FIG. 10 is a diagram depicting another magnetic marker according to Embodiment 2;
FIG. 11 is a diagram depicting another magnetic marker according to Embodiment 2;
FIG. 12 is a diagram depicting another magnetic marker according to Embodiment 2;
FIG. 13 is a diagram depicting another magnetic marker according to Embodiment 2;
FIG. 14 is a front view of an end face of the magnetic marker including an information providing part according to Embodiment 4;
FIG. 15 is a block diagram depicting electrical configurations of an RFID tag and a tag reader according to Embodiment 4;
FIG. 16 is a graph depicting a magnetic field distribution of the magnetic marker in a vertical direction according to Embodiment 5;
FIG. 17 is a diagram depicting a sheet magnetic marker according to Embodiment 5; and
FIG. 18 is a diagram depicting an example of application of a sheet magnetic marker according to Embodiment 5.

DESCRIPTION OF EMBODIMENT

The following describes preferred aspects of the present invention.

A magnet constituting a magnetic marker may be a sintered magnet molded by sintering a magnetic powder. The magnetic powder may be a magnetic powder of iron oxide. The magnet composed of iron oxide, which hardly deteriorates in magnetic property due to oxidation, eliminates the need for a sealed structure for preventing oxidation and, for example, can be directly accommodated in a hole provided in a road surface.

The magnet may be a molded article having the magnetic powder dispersed in a polymer material constituting a base material.

Examples of a magnet composed of a polymer material include a plastic magnet, a rubber magnet, and the like. For example, a highly-durable magnetic marker can be achieved by employing a plastic magnet, a rubber magnet, or the like, which is less likely to crack than a magnet such as a sintered magnet. Further, employing these magnets which can be molded with high accuracy at comparatively low cost makes it possible to provide high-quality magnetic markers at reduced production cost. Further, a rubber magnet or the like, which has flexibility, can cope with irregularities on a road surface at the time of laying installation, irregular deformation of a road surface during operation, and the like, thus making it possible to prevent trouble such as cracking.

The magnetic marker may be a columnar magnet measuring 50 mm or smaller in diameter.

A columnar magnetic marker whose cross-sectional shape falls within a circle measuring approximately 50 mm or smaller in diameter makes it possible to reduce installation cost, as it can be laid, for example, by providing a comparatively small hole measuring approximately 50 mm in diameter in a road surface. Furthermore, for example, a small columnar plastic or rubber magnet or the like measuring approximately 50 mm in diameter can be directly disposed of together with a used paving material at the time of repaving or the like of the road surface. In this case, work such as repaving can be efficiently carried out, so that there is little fear of a rise in cost of work such as repaving even in the case of a road surface laid with a magnetic marker. It should be noted that the magnetic marker may be a columnar magnet measuring 30 mm or smaller in diameter. A thin magnetic marker measuring 30 mm or smaller in diameter brings further improvement to the aforementioned effects.

The magnetic marker may include a retaining structure for preventing the magnetic marker from being removed in a pull-out direction when accommodated in a hole.

Examples of the retaining structure include a step provided on an outer circumferential side surface and a structure, provided to extend from a front end side, that includes a shape or the like that acts like a root.

A protective layer including at least fiber may be formed on all or a part of an outer circumferential surface of the magnet.

Forming a protective layer including fiber makes it possible to further improve the durability of the magnet. For example, the protective layer may be made of a composite material obtained by dispersing glass fiber or the like in a resin material. Further, for example, in the case of a magnet obtained by dispersing a magnet powder in a polymer material such as asphalt, which is a paving material, there is fear that the magnetic powder may flow out into the paving material forming the road surface; however, forming a protective layer including fiber makes it possible to prevent the outflow of the magnetic powder.

The magnetic marker may include an information providing part that provides a vehicle side with information by radio communication.

This allows the magnetic marker to provide more information and makes the magnetic marker more useful. Radio communication makes it possible to provide the vehicle side with more information. For example, a wireless tag may be used. A wireless tag makes it comparatively easy to rewrite recorded information. It should be noted that the magnetic marker, which is a magnet obtained by dispersing a magnetic power, is high in electrical internal resistance and is not likely to inhibit radio wave communication. Therefore, it is also possible to provide the information providing part on the opposite side of the magnetic marker from the vehicle side. Employing such an arrangement structure makes it possible to prevent trouble in radio communication functioning, for example, due to treading or the like by a vehicle tire or the like.

The information providing part may provide encrypted information that is able to be read out with an encryption key.

In this case, information can be selectively provided to a particular vehicle possessing an encryption key. For example, while different encryption keys are set for a large-sized vehicle such as a trailer and a standard-sized vehicle, the information providing part may be configured to provide two types of information with different encryption keys in a time-division manner. In this case, different pieces of information can be provided according to whether the vehicle is a large-sized vehicle or a standard-sized vehicle. Further, for example, it is also possible to configure an encryption key that includes a bit value representing whether vehicle-side data such as vehicle speed or continuous driving time has exceeded a threshold. In this case, for example, warning information can be selectively provided to a vehicle traveling over the speed limit.

The magnetic marker may be able to be demagnetized and magnetized in a laid state.

Being able to be demagnetized and magnetized in a laid state eliminates the need for removing the magnetic marker from the road every time it needs to be magnetized, thus making it possible to reduce the cost of work. Further, in operation such as providing information according to magnetic polarity, a change or the like of information becomes easier by switching of magnetic polarities.

A marker system according to the present invention may be a system in which the columnar magnetic marker is laid in a state of being accommodated in a hole bored in a road surface.

Note here that the state where the magnetic marker is accommodated in the hole means a state where at least a part of the magnetic marker is accommodated in the hole. In a state where the magnetic marker is accommodated in the hole in this way, the risk of being damaged by a tire chain, a snow-removing blade of a snow-removing vehicle, or the like at the time of accumulation of snow can be better reduced than in a case where the magnetic marker is installed, for example, on a top side of a road surface. Further, a laying method by which to accommodate the columnar magnetic marker in a hole bored in a road surface makes it possible to lay the magnetic marker in a simple way, thus making it possible to reduce installation cost.

The columnar magnetic marker may be accommodated in the hole in a state of being flush with the road surface or recessed from the road surface.

Accommodating the whole magnetic marker in the hole eliminates a part that protrudes from the road surface, thus making it possible to further reduce the risk of being damaged by a tire chain, a snow-removing blade of a snow-removing vehicle, or the like at the time of accumulation of snow.

The columnar magnetic marker may be accommodated in the hole in a state of being recessed from the road surface, and the hole may be provided with a lid.

The lid makes it possible to protect the magnetic marker and reduce the occurrence of trouble during operation. The lid may be a lid made of plastic or metal, and also a lid made of a paving material such as asphalt, or the like.

The magnetic marker may include plural types of magnetic marker having different ratios of height to a size of a cross-section.

The cost of providing a hole, the frequency of snow-removal work or passage of a large-sized trailer, and the like vary depending on the road. The ratio of height to the size of a cross-section may be changed according to the cost, the frequency, and the like. A comparatively long and narrow columnar magnetic marker having a large ratio of height to the size of a cross-section makes it possible to reduce the diameter of a hole that is bored.

The marker system may include a sheet magnetic marker that is a magnet, formed into a sheet shape, that contains a magnetic powder that is a powder of a magnetic material, and in the marker system, the sheet magnetic marker may be installed on a tope side of the road surface.

For example, in a close-in parking lot or the like of a shopping center, where no snow-removal work is performed by a snow-removing vehicle and no large-sized trailer passes, a laying method by which to install a magnetic marker on a top side of a road surface can be employed. In the case of this laying method, a suitable magnetic marker is close in shape to a sheet having a small ratio of height to the size of a cross-section. A sheet magnetic marker can be laid simply by being pasted without the need to provide a hole in a place where it is laid, thus making it possible to reduce installation cost. A sheet magnetic marker is suitable for an underground parking lot, a private road, a private passage, a garage guidepath, and the like as well as a closed-in parking lot of a shopping center. Further, a sheet magnetic marker is suitable to be laid on a place where it is difficult, because of the structure of a road, to bore a hole in which a magnetic marker is to be accommodated.

The sheet magnetic marker may be laid on a detour temporarily set to avoid entry of the vehicle into a region into which entry is temporarily restricted or a guidepath temporarily set so as to guide the vehicle.

On the occasion of operation where there is a possibility of changing or moving places of installation, a sheet magnetic marker whose replacement or the like is comparatively easy is suitable.

It should be noted that drive assist control that is achieved on the vehicle side using the magnetic marker and the like marker system according to the present invention includes various types of control such as traveling control, warning control, and information notification control. Examples of the traveling control include automatic steering control that causes a vehicle to travel along magnetic markers laid along a lane, merging or diverging control based on magnetic markers laid in or on a merging lane or a diverging lane, stop control that causes a vehicle to stop upon detection of a magnetic marker laid before a stop line of an intersection or the like, and similar control. Examples of the warning control include control that gives a warning against lane departure by using magnetic markers laid along a lane as a bench mark, control that gives a warning against excessive speed during passage over a magnetic marker laid before an intersection or the like, and similar control. Examples of information notification control include control that notifies approaching to an intersection, a diverging lane, or a toll gate, control that notifies in high accuracy the position of an intersection at which a right turn or the like is made during route-guiding navigation, and similar control. In the case of a configuration in which an arrangement of the north and south poles of magnetic markers are used to provide information to the vehicle side, further examples may include control that notifies the information and similar control.

The magnetic sensor may be at least one of a magneto-impedance sensor, a flux-gate sensor, and a TMR sensor.

A marker system including these high-sensitivity magnetic sensors can relatively reduce a magnetic strength required of the magnetic marker.

The magneto-impedance (MI) sensor is a magnetic sensor including a magneto-impedance element containing a magneto-sensitive body whose impedance varies according to an external magnetic field. The magneto-impedance element (MI element) is an element that detects magnetism by utilizing a magneto-impedance effect (MI effect) attributed to a skin effect. The skin effect is an increase in current density of a skin layer during passage of a pulse current, a high-frequency current, or the like through the magneto-sensitive body. The MI effect is a sensitive change in impedance of the magneto-sensitive body according to a fluctuation in depth (thickness) of the skin layer by an external magnetic field. The MI element utilizing this MI effect makes it possible to measure magnetism with high sensitivity. It should be noted that a large number of applications have been filed for an MI sensor utilizing an MI element and, for example, detailed descriptions are found in Publication WO 2005/19851, Publication WO 2009/119081, Japanese Patent No. 4655247, and the like.

It is preferable that the magneto-sensitive body of the MI element be a high-permeability alloy magnetic body. A preferable example is a magnetic body such as a wire or thin film made of a soft magnetic material such as a CoFeSiB-based alloy, and an especially preferable example is a zero-magnetostrictive amorphous wire in terms of sensitivity, cost, and the like.

A change in impedance of the magneto-sensitive body during passage of a high-frequency current or the like, for example, may be directly detected from a voltage between both ends of the magneto-sensitive body or may be indirectly detected as a change in electromotive force via a detection coil (pickup coil) wound around the magneto-sensitive body. An MI element including a detection coil is useful, as it makes it possible to detect a direction of action of magnetism.

The flux-gate sensor is a high-sensitivity magnetic sensor that measures magnetic strength by a saturation timing with utilizing the fact that the saturation timing of a core flux changes in accordance with the external magnetic field when a periodic current flows through a soft magnetic core. It should be noted that a large number of applications have been filed for a flux-gate sensor and, for example, detailed descriptions are found in Publication WO 2011/155527, JP 2012-154786, and the like.

The TMR (tunnel magnetoresistance) sensor is a high-sensitivity sensor including a structure in which an insulator layer having a film thickness of approximately 1 nm is interposed between ferromagnetic layers. The TMR sensor achieves high sensitivity by utilizing a tunnel magnetoresistance (TMR) effect, in which the electric resistance of the insulator layer significantly changes in accordance with the external magnetic field when a voltage applied vertically with respect to the film surface produces a tunnel effect that permits a current flow through the insulator layer. It should be noted that a large number of applications have been filed for a TMR sensor and, for example, detailed descriptions are found in Publication WO 2009/078296, JP 2013-242299, and the like.

Embodiments

Embodiment 1

Embodiment 1 is an example directed to a marker system 1S having a magnetic marker 1 laid in a vehicular road. The marker system 1S is compatible with a vehicle 5 having a magnetic sensor 2 attached to a bottom surface side thereof. This content is described with reference to FIG. 1 to FIG. 4.

In the marker system 1S (FIG. 1), magnetic markers 1 that are laid in a road surface 53 are placed along the center of a lane. On the side of the vehicle 5 that is compatible with the marker system 1S, the magnetic sensor 2 is attached to a vehicle body floor 50 constituting a bottom surface of the vehicle. A height of attachment of the magnetic sensor 2 falls within a possible range of 100 to 250 mm on the basis of the minimum ground clearance of various types of vehicle such as a bus or a truck as well as a passenger vehicle. On the vehicle 5 side, an output signal from the magnetic sensor 2 is inputted to an onboard ECU and the like (not illustrated) and used for various types of control such as automatic steering control and lane departure warning for lane keeping.

The magnetic marker 1 (FIG. 2) is a cylindrical magnet measuring 20 mm in diameter (D) and 28 mm in height (H). The magnet constituting the magnetic marker 1 is an isotropic ferrite plastic magnet containing a polymer material that serves as a base material and a magnetic powder of iron oxide, dispersed in the polymer material, that serves as a magnetic material, and has such a property that Maximum Energy Product (BHmax)=6.4 kJ/m$^3$. The magnetic marker 1 is laid in a state of having been accommodated in a hole 530 (FIG. 1) bored in the road surface 53. It should be noted that the magnetic marker 1 may also have a protective layer formed by a resin mold on an outer circumferential surface thereof. Further, the resin mold may be one reinforced by glass fiber.

Table 1 depicts a part of the specifications of the magnetic marker 1 according to Embodiment 1.

TABLE 1

| Type of magnet | Ferrite plastic magnet |
| --- | --- |
| Diameter | φ 20 mm |
| Height | 28 mm |
| Magnetic flux density Gs of the surface | 45 mT |

The magnetic marker 1 has a magnetic flux density Gs of 45 mT of a surface thereof. The magnetic flux density Gs of 45 mT is equal to or lower than the magnetic flux density of a surface of a magnet sheet or the like that is used by being attached, for example, to a whiteboard of an office or the like of a door of a refrigerator or the like. Considering these magnet sheets as a reference, it is possible to intuitively grasp that the magnetic marker 1 according to Embodiment 1 generates a very weak magnetic force. With this magnetic force of the magnetic marker 1, it is difficult to attract and hold a metal body such as a nail or a bolt. It should be noted that a magnetic field distribution in a vertical direction of the magnetic marker 1 will be described later with reference to FIG. 4.

As depicted in the block diagram of FIG. 3, the magnetic sensor 2 on the vehicle 5 side is a single-chip MI sensor obtained by integrating an MI element 21 and a drive circuit. The MI element 21 is an element including a substantially zero-magnetostrictive amorphous wire (which is an example of a magneto-sensitive body) 211 made of a CoFeSiB-based alloy and a pickup coil 213 wound around the amorphous wire 211. The magnetic sensor 2 measures a voltage that is generated in the pickup coil 213 when a pulse is applied to the amorphous wire 211, thereby detecting magnetism that acts on the amorphous wire 211, which is a magneto-sensitive body.

The drive circuit is an electronic circuit including a pulse circuit 23 that supplies a pulse current to the amorphous wire 211 and a signal processing circuit 25 that samples and outputs, a voltage generated in the pickup coil 213 at predetermined timings.

The pulse circuit 23 is a circuit including a pulse generator 231 that generates a pulse signal from which a pulse current is generated. The signal processing circuit 25 is a circuit that takes out an induced voltage of the pickup coil 213 via a synchronous detector 251 that is opened and closed in tandem with a pulse signal, and amplifies the induced voltage by a predetermined amplification factor with an amplifier 253. A signal amplified by the signal processing circuit 25 is outputted as a sensor signal to the outside.

Table 2 depicts a part of the specifications of the magnetic sensor 2.

TABLE 2

| Measuring range | ±0.6 mT |
| --- | --- |
| Magnetic flux resolution | 0.02 µT |
| Sampling period | 3 kHz |

The magnetic sensor 2 is a high-sensitivity sensor having a magnetic flux density falling within a measuring range of ±0.6 mT and a magnetic flux resolution of 0.02 µT in the measuring range. Such high sensitivity is achieved by the MI element 21 using the MI effect by which the impedance of the amorphous wire 211 sensitively varies according to an external magnetic field. Furthermore, the magnetic sensor 2 is capable of high-speed sampling with a period of 3 kHz, and is also compatible with high-speed traveling of a vehicle.

The following describes a magnetic field distribution in a vertical direction of the magnetic marker 1 according to Embodiment 1 with reference to FIG. 4. FIG. 4 is a semilogarithmic graph depicting a simulation result yielded by an axisymmetric three-dimensional magnetostatic analysis based on a finite element method. In FIG. 4, the vertical axis represents a logarithmic scale of the magnetic flux density of magnetism that acts in a vertical direction, and the horizontal axis represents a height in a vertical direction (height above a marker surface) based on the surface (marker surface) of the magnetic marker 1. In FIG. 4, the "magnetic flux density Gs of the surface" is a magnetic flux density at a height of 0 mm above the marker surface, and the "magnetic flux density Gh in a position at a height of 20 mm" is a magnetic flux density at a height of 250 mm above the marker surface.

As depicted in FIG. 4, the magnetic marker 1 can effect magnetism of a magnetic flux density of 8 µT (8×10$^{-6}$ T) or higher in a possible range of 100 to 250 mm of the height of attachment of the magnetic sensor 2. In a case where magnetism of a magnetic flux density of 8 μT acts, the magnetic marker 1 is detectable with high reliability using the magnetic sensor 2 with a magnetic flux resolution of 0.02 μT (see FIG. 2).

The magnetic marker 1 according to Embodiment 1 keeps down the magnetic flux density Gs of 45 mT of the surface while securing the magnetic property of being detectable by the magnetic sensor 2. As noted above, this magnetic flux density of 45 mT is equal to or lower than the magnetic flux density of a surface of a magnet sheet that is attached, for example, to a whiteboard or a door of a refrigerator or the like. Therefore, the magnetic marker 1 has an extremely low risk of attracting and holding a metal body such as a nail or a bolt on a road.

It should be noted that the magnetic flux density Gh in a position at a height of 250 mm above the surface of the magnetic marker 1 needs only be 0.5 μT or higher. A magnetic marker 1 that effects magnetism of a magnetic flux density Gh of 0.5 μT or higher in a position at a height of 250 mm can be detected with high reliability using a high-sensitivity sensor such as an MI sensor including an MI element having a magnetic flux resolution of approximately 0.01 to 0.02 μT, a flux-gate sensor, or a TMR sensor. It should be noted that the magnetic flux density Gh may be a magnetic flux density of magnetism in a vertical direction or may be a magnetic flux density of magnetism in another direction.

As for the magnetic marker 1, if the magnetic flux density Gh in a position at a height of 250 mm is set at approximately 0.5 μT, the magnetic flux density Gs of the surface can be reduced to approximately several millitesla. A magnetic flux density of several millitesla is a very weak magnetic force that is weaker than the magnetic force of a magnetic sheet that is attached, for example, to a whiteboard or the like. The magnetic marker 1, whose magnetic force is weak, hardly has a risk of attracting metallic dust or the like on a road.

It should be noted that in employing a magnetic sensor including a highly directional MI element, one MI element may be provided for each magnetic detection direction. While it is only necessary to provide one MI element in a case where only a magnetic component in a vertical direction is detected, alternatively, MI elements may be provided in correspondence with three-dimensional directions, respectively. Providing MI elements in correspondence with three-dimensional directions, respectively, makes it possible to three-dimensionally detect a magnetic component that is generated from the magnetic marker. For example, also may be provided are an MI element that detects magnetism in a direction vertical to the road surface 53, an MI element that detects magnetism in a traveling direction of the vehicle 5, and an MI element that detects magnetism in a crosswise direction of the vehicle. Detecting magnetism in the traveling direction of the vehicle makes it possible to measure the position of the magnetic marker in the traveling direction of the vehicle with high accuracy, for example, by detecting the reverse of the magnetism acting direction.

In a case where a plurality of MI elements are provided, a pulse circuit and a signal processing circuit may be shared, for example, in a time-division manner instead of being provided for each MI element. Being able to share the circuits makes it easy to achieve reductions in size and cost of the magnetic sensor.

A plurality of magnetic sensors may be disposed along the crosswise direction of the vehicle. The relative position of the magnetic marker in the crosswise direction of the vehicle may be determined by detecting a peak of a distribution of magnetism having acted on each magnetic sensor.

Although the MI sensor including the MI element has been illustrated as a magnetic sensor, a flux-gate sensor or a TMR sensor can be employed as a magnetic sensor instead of the MI sensor. In a case where two or more magnetic sensors are used, a combination of two or more types of MI sensor, flux-gate sensor, and TMR sensor can be employed. An MI sensor, a flux-gate sensor, and a TMR sensor are all known as magnetic sensors that are able to detect magnetism with high sensitivity. In combination with a magnetic marker having a reduced magnetic flux density Gs of the surface, a marker system using at least one of these types of magnetic sensor is able to detect, with high reliability, magnetism that the magnetic marker generates.

The magnetic material and the type of magnet that configure the magnetic marker are not limited to those of Embodiment 1. As the magnet material and the type of magnet, various materials and types can be employed. It is preferable that a magnetic material and a type be selectively determined as appropriate according to the magnetic specifications, environmental specifications, and the like required of the magnetic marker. An employable example of a magnetic material is a material that hardly deteriorates in magnetic property even under oxidation of ferrite or the like. Employable examples of magnets include a sintered magnet, a plastic magnet, a gum magnet, a rubber magnet, and the like.

Although Embodiment 1 has illustrated a cross-sectional shape of the magnetic marker 1 as a circle, a polygon such as a quadrangle, a triangle, or a pentagon may be employed as the cross-sectional shape instead of a circle.

A magnetic marker that is a magnet such as a ferrite rubber magnet having a magnetic powder dispersed in a polymer material becomes higher in durability by being able to absorb a deformation of the hole 530 caused by a thermal expansion, a thermal shrinkage, or the like of the road. Further, at the time of repair work on the road surface 53 such as repaving, the magnetic marker can be disposed of together with waste of paving materials or the like. As the polymer material that constitutes the base material of the magnetic marker, a resin material or the like may be employed instead of the plastic of Embodiment 1.

It should be noted that a computer simulation according to Embodiment 1 has its simulation accuracy checked in advance by trials under some simulation conditions. Further, as for the magnetic marker 1, it has been confirmed by trials that a magnetic property which is close to a result of the computer simulation can be obtained.

Embodiment 2

Embodiment 2 is an example of installation work on a magnetic marker 1. This content is described with reference to FIG. 5 to FIG. 13. The following describes (1) Laying and (2) Demagnetization and Magnetization as installation work on the magnetic marker 1.

(1) Laying

As examples of the work of laying the magnetic marker 1, three types of laying work of FIG. 5, FIG. 6, and FIG. 8 are illustrated. In the laying work of FIG. 5, first, a hole 530 measuring 20 mm in diameter and 30 mm in depth is provided in a road surface 53 using a drill or the like. In general, since the road surface 53 has its top side formed by an asphalt layer measuring approximately 60 mm in thickness, a hole measuring 30 mm in depth can be comparatively easily bored in the road surface 53. Press-fitting, into the hole 530, the magnetic marker 1 having an adhesive material applied in advance to an outer circumference thereof allows the magnetic marker 1 to be fixed in the hole 530 with high reliability by the subsequent hardening of the adhesive material.

In the laying work of FIG. 6, a paving material, such as asphalt, of which the road surface 53 is made is softened by heating the perimeter of the hole 530 with a burner or the like, and then the magnetic marker 1 measuring 20 mm in diameter is press-fitted into the hole 530. The paving material thus softened into a semi-molten state adheres to the perimeter of the magnetic marker 1 and hardens, whereby the magnetic marker 1 is fixed in the hole 530 with high reliability. In this case, asphalt, which is a paving material, functions as an adhesive material.

Note that, in the laying work of FIG. 6, the hole 530 has a depth of 40 mm whereas the magnetic marker 1 has a height of 28 mm. Press-fitting the magnetic marker 1 until it reaches the bottom of the hole 530 sets the magnetic marker 1 slightly recessed from the road surface 53. A lid 531 may be fitted in this recess (FIG. 7). As the lid 531, a lid made of resin, metal, asphalt, or the like can be employed. A lid made of resin or metal is also useful as a mark for a laying point of the magnetic marker 1. A lid obtained by molding a paving material into the shape of a disk may be employed to be integrated with the surroundings by being fitted in a state where the ambient temperature is high, or a lid may be formed by filling the recess with a paving material in a molten state. A configuration in which a lid is provided can also be applied to the laying work of FIG. 5 in case the hole 530 is bored deeper.

In the laying work of FIG. 8, a hole 530 measuring 30 mm in diameter is filled with an adhesive material yet to be hardened, and then a magnetic marker 1 is pushed in to be accommodated in the hole 530. Pushing the magnetic marker 1 in causes the adhesive material to be pushed out by the magnetic marker 1 to form a lid by going round to the top surface side via the outer circumferential side. The adhesive material may be an adhesive material such as an epoxy adhesive or a silicon rubber adhesive, or asphalt, which is a paving material, or the like may be used as the adhesive material. In a case where asphalt is used, integration with the surrounding road surface 53 can be achieved.

Further, as depicted in FIG. 9 to FIG. 13, a retaining structure may be provided on the outer circumference of the magnetic marker 1. Providing a retaining structure makes it less likely for the magnetic marker 1 to be removed by being pulled out of the hole 530. An example of a retaining structure is an annular part or the like having raised shapes on an outer circumferential side thereof as depicted in FIG. 9. Each of these raised shapes has a cross-sectional shape that forms a shelf-surface-shaped step by becoming gradually larger in amount of an overhang toward the outer circumferential side in a pull-out direction from the hole 530. Such a raised shape effectively acts to prevent removal when a force acts on the magnetic marker 1 in the pull-out direction. On the other hand, there is little fear that there may be excessive insertion resistance, for example, in press-fitting the magnetic marker 1 into the hole 530, as the amount of an overhang of the raised shape becomes gradually smaller in an insertion direction opposite to the pull-out direction.

A constriction such as that depicted in FIG. 10 may be provided at an intermediate position of the magnetic marker 1 in a height direction. In a case where the magnetic marker 1 is buried, the paving material and the adhesive material are hardened in this constriction, so that it becomes difficult for the magnetic marker 1 to be removed.

Furthermore, a projecting shaped anchor may be provided at the front end of the magnetic marker 1 in the insertion direction as depicted in FIG. 11 to FIG. 13. The anchor acts like a root of a tree to prevent removal of the magnetic marker 1. The front end of the anchor may be formed into the shape of an arrow (see FIG. 12). The anchor may be formed into a bifurcated or trifurcated shape that broadens toward the end (see FIG. 13).

(2) Demagnetization and Magnetization

The magnetic marker 1, which is a ferrite plastic magnet, by causing an external magnetic field to act from the top side of the road surface 53, makes it possible to easily carry out work such as demagnetization (degaussing), which prevents generation of a magnetic force, and magnetization, which magnetizes the magnetic marker 1 so that the magnetic marker 1 exhibits a particular magnetic polarity.

For example, in a multiple-lane road, it is possible to demagnetize a magnetic marker 1 of a particular lane so that the vehicle is not guided into the lane. Further, for example, in performing the work of repaving the road surface 53, stripping or the like of the old pavement may be performed after demagnetization has been conducted. Although the magnetic marker 1, which has a very weak magnetic force, can be directly disposed of together with the used paving material without being demagnetized, demagnetizing the magnetic marker 1 in advance makes it possible to nearly perfectly prevent a magnetic problem during disposal.

In such a case of operation where the magnetic polarities of magnetic markers 1 vary from lane to lane or the magnetic polarities of magnetic markers 1 vary according to whether they are in particular places, magnetization work for switching the magnetic polarity of a magnetic marker 1 according to a changing of lanes or a positional changing of particular places may be carried out. Further, magnetization work of remagnetization may be executed when the magnetic marker 1 becomes lower in magnetic force.

Embodiment 2 illustrates installation work such as laying of a columnar magnetic marker measuring 20 mm in diameter. A columnar magnetic marker measuring 50 mm or smaller in diameter makes it only necessary to provide a comparatively small hole on a road surface and therefore makes it possible to employ simple and low-cost installation work as is the case in Embodiment 2. A columnar shape measuring 300 mm or smaller in diameter is more preferable.

As for the other configurations and working effects, Embodiment 2 is the same as Embodiment 1.

Embodiment 3

Embodiment 3 is an example based on the magnetic marker 1 according to Embodiment 1 or 2 in which the base material of a magnet is changed and a protective layer is provided on the outer circumference.

A magnetic marker according to Embodiment 3 is a magnet containing asphalt (paving material), i.e. a polymer material, that serves as a base material and a magnetic powder of iron oxide dispersed in the polymer material. This magnetic marker has a protective layer made of a composite material composed of glass fiber impregnated with asphalt formed on an outer circumferential surface thereof.

The magnetic marker according to Embodiment 3, which is a magnet containing asphalt as a base material, easily fits in the surrounding asphalt when accommodated in a hole. On the other hand, since the protective layer, which configures the outer circumference of the magnetic marker, is composed of glass fiber, the protective layer reduces the risk of the outflow of the magnetic powder to the surroundings.

It should be noted that while a base material which is the same as that of Embodiment 1 is employed, a protective layer obtained by impregnating glass fiber or the like with a resin material may be employed.

As for the other configurations and working effects, Embodiment 3 is the same as Embodiment 1.

Embodiment 4

Embodiment 4 is an example in which the magnetic marker according to Embodiment 1, 2, or 3 is provided with an RFID tag 15 serving as an information providing part. This content is described with reference to FIG. 14 and FIG. 15.

A magnetic marker 1 according to Embodiment 4 is a marker obtained by molding a magnet of the same composition as that of Embodiment 1 into the shape of a column measuring 30 mm in diameter and 11 mm in height. The magnetic marker 1 has a sheet RFID tag (Radio Frequency IDentification, wireless tag) 15 laminated on one end face thereof (FIG. 14). The magnetic marker 1 according to Embodiment 4 including the RFID tag 15 is not only magnetically detectable on a vehicle side but also able to provide the vehicle side with various types of information without resorting to a magnetic method.

As depicted in FIG. 14, the RFID tag 15, which constitutes an example of the information providing part, is an electronic component measuring approximately 0.5 mm in thickness formed by mounting an IC chip 157 on a surface of a tag sheet 150 which is a rectangular sheet member measuring 22 mm×10 mm. The RFID tag 15 operates on electric power supplied from an outside source by radio transmission and wirelessly transmits information stored on the IC chip 157.

The tag sheet 150 is a sheet member cut out of a PET film. Formed on a surface of the tag sheet 150 are a loop coil pattern 151 and an antenna pattern 153 that are printed patterns of conductive ink composed of silver paste. The loop coil pattern 151 and the antenna pattern 153 exhibit a substantially annular shape having a notch in one place. Formed in the notch portion is a chip placement region (not illustrated) in which to place the IC chip 157. Bonding the IC chip 157 to the tag sheet 150 causes each of the patterns 151 and 153 to be electrically connected to the IC chip 157.

As depicted in FIG. 14 and FIG. 15, the loop coil pattern 151 is a pattern that constitutes a power receiving coil 152 in which an exciting current is generated by the external electromagnetic induction. The antenna pattern 153 is a pattern that constitutes a transmitting antenna 154 that wirelessly transmits information. The power receiving coil 152 constituted by the loop coil pattern 151 and the transmitting antenna 154 constituted b the antenna pattern 153 both have sensitivity in a direction vertical to the surface on which they are formed, and are suitable for communication or the like with a tag reader 3 attached to the vehicle body floor constituting the bottom surface of the vehicle. As the conductive ink for printing each of the patterns 151 and 153, graphite paste, silver chloride paste, copper paste, nickel paste, or the like as well as silver paste can be used. Furthermore, each of the patterns 151 and 153 can also be formed by copper etching or the like.

The IC chip 157 (FIG. 14) is an electronic component obtained by mounting a semiconductor element 158 on a surface of a sheet base material 159. The semiconductor element 158 includes a ROM, a RAM, and the like as memory unit. The RFID tag 15 is fabricated by pasting the IC chip 157 on the surface of the tag sheet 150. An interposer-type IC chip 157 provided with an electrode (not illustrated) can be pasted by employing various bonding methods such as ultrasonic bonding and caulking bonding as well as a conductive adhesive. It should be noted that an electronic configuration of the RFID tag 15 will be described later with reference to the block diagram of FIG. 15.

Employable examples of the tag sheet 150 of the RFID tag 15 and the base material 159 of the IC chip 157 include a resin film of polyethylene (PE), polyethylene terephthalate (PET), polypropylene (PP), or the like, paper, and the like. Furthermore, the IC chip 157 may be a semiconductor element per se or may be a chip obtained by packing a semiconductor element with plastic resin or the like.

The magnetic marker 1 according to Embodiment 4 is laid, for example, so that the end face thereof on which the RFID tag 15 is laminated is located on a side opposite to the vehicle side, i.e. on the bottom side of the hole. The magnetic marker 1, which is a ferrite plastic magnet, only affects power receiving and communication of the RFID tag 15 to a small extent. It is therefore possible to place the RFID tag 15 on an end face side of the magnetic marker 1 that faces the bottom of the hole. Alternatively, the magnetic marker 1 may be laid so that the end face thereof on which the RFID tag 15 is laminated faces the vehicle body floor, or the RFID tag 15 may be provided inside the magnetic marker 1 by insert molding or the like.

The vehicle that is compatible with the magnetic marker 1 according to Embodiment 4 includes, in addition to the magnetic sensor (denoted by Symbol 2 in FIG. 1) that magnetically detects the magnetic marker 1, a tag reader 3 (FIG. 15) that acquires information from the RFID tag 15.

The tag reader 3, which configures an example of an information acquisition part, includes a power-supply part 31 that supplies electric power to the RFID tag 15 of the magnetic marker 1 and an information acquisition part 33 that acquires information wirelessly transmitted by the RFID tag 15. The power-supply 31 is an electronic circuit that generates a magnetic field by supplying a current to a loop coil 310 and transmits electric power by electromagnetic induction. The information acquisition part 33 is an electronic circuit that receives radio waves from the RFID tag 15 via the loop antenna 330 and takes out information by demodulation.

The tag reader 3 transmits electric power by generating the exciting current in the power receiving coil 152 on an RFID tag 15 side by electromagnetic induction based on a magnetic field generated by the loop coil 310 and causes a power receiving part 155 on the RFID tag 15 side to store electric power. On the RFID tag 15 side, a radio transmission part 156 operates in a response to electric power supplied from the power receiving part 155 and transmits various types of information to the vehicle side via the transmitting antenna 154. Further, a working vehicle equipped with a reader-writer having a data writing function is able to execute writing of new information into a RAM, rewriting of data, and the like.

The magnetic marker 1 according to Embodiment 4 including the RFID tag 15 is able to provide a vehicle side with various pieces of information. Examples of the information that is provided to the vehicle side include the following: (1) Position Information, (2) Height Information, (3) Traffic Information, and the like. It should be noted that magnetic detection of the magnetic marker 1 makes it possible to acquire information such as the presence or absence of the magnetic marker 1 and an offset amount (shift amount) of the vehicle in a vehicle width direction during passage over the magnetic marker 1. These pieces of information are applicable to various types od drive assist such as lane departure warning, automatic steering, lane departure avoidance control, and automatic driving.

(1) Two-Dimensional Position Information

Providing the vehicle side with position information allows a vehicle side to acquire accurate position information without resorting to positioning unit such as the GPS (Global Positioning System) and makes it possible to achieve a navigation system. When a vehicle is located in a gap between magnetic markers 1 that are adjacent to each other in a traveling direction of the vehicle, it is only necessary to estimate a vehicle position by autonomous navigation using measured values such as a vehicle speed and a yaw rate and acquire an accurate position every time the vehicle passes over the magnetic marker 1.

A combination of a navigation system having positioning unit such as the GPS and magnetic markers is also effective. Laying, in a place such as a tunnel or an urban canyon where reception of GPS radio waves is impossible or ends to be unstable, magnetic markers 1 that are able to provide position information make it possible to back up the poor state of reception of GPS radio waves and improve the accuracy with which the navigation system captures a position.

(2) Height Information (Three-Dimensional Position Information)

For example, it is also possible to lay magnetic markers 1 in advance in a passage of an automated parking tower or the like of a shopping center or the like and provide a vehicle side with height information such as a floor number. For example, it is not easy to identify the number of a floor of a building depending on positioning unit such as the GPS, and even if the parking side provides information on parking availability designated with a floor number, it is difficult to perform routing assistance to the empty space with high accuracy. Providing floor number information from a magnetic marker 1 makes it possible to achieve high-accuracy routing assistance to an empty space in an automated parking tower.

(3) Traffic Information

It is also possible to provide a vehicle side with traffic information such as intersection information, diverging lane information, and merging lane information. For example, it is preferable to install the magnetic marker 1 at a characteristic point on a road (traveling path) such as an intersection, a diverging lane, or a merging lane and provide information on the type of a road shape from the magnetic marker 1 side. Examples of drive assists that utilize traffic information include various types of drive assist control such as the presentation of traffic information by a display, a warning sound, or the like that calls attention to the driver, brake control, and steering control. For example, if the distance between a stop line of an intersection and the magnetic marker 1 is fixed, brake control for causing the vehicle to stop at the stop line can be executed with high accuracy. Further, for example, if the distance between a start position of a diverging lane and the magnetic marker 1 is fixed, drive assist control for letting the vehicle enter the diverging lane can be executed with high accuracy. It should be noted that information on the distance between an intersection or a diverging lane and the magnetic marker 1 may be contained in information that is transmitted from the RFID tag 15.

It is also possible to employ, as an RFID tag, a wireless tag that provides encrypted information that is able to be read out with an encryption key. Information can be selectively provided to a particular vehicle possessing an encryption key.

As for the other configurations and working effects Embodiment 4 is the same as the other embodiments.

Embodiment 5

Embodiment 5 is an example of various magnetic markers having different ratios of height to the size of a cross-section. This content is described with reference to FIG. 16.

Magnetic markers illustrated are four types of magnet measuring from 20 to 100 mm including 20 mm in diameter, but are identical in composition. Each magnetic marker has its height set so that the magnetic flux density Gh at a height of 250 mm is 8 µT regardless of the difference in diameter. Magnetic field distributions in a vertical direction of these magnetic markers are simulated as illustrated in FIG. 16.

Among the explanatory notes on the graph of FIG. 16, the legend "ø20 H28" indicates a magnetic marker measuring 20 mm in diameter and 28 mm in height. This graph is a semilogarithmic graph which is similar to that of FIG. 4. FIG. 16 depicts that the larger a magnetic marker is in diameter, the more the magnetic flux density Gs of the surface can be reduced. For example, a comparison of the magnetic flux density Gs of the surface depicts that Gs=1 mT in the case of a magnet measuring 100 mm in diameter and 1 mm in thickness (height) whereas Gs=45 mT in the case of a magnet measuring 20 mm in diameter and 28 mm in height.

A magnetic marker measuring 100 mm in diameter has a thickness of 1 mm. Such a sheet magnetic marker can be laid on a road surface 53 by being pasted to the road surface 53. Installation on a surface by pasting or the like makes removal work extremely easy. In the case of installation on a top side of the road surface 53, as depicted in FIG. 17, a protective layer 12 formed by a resin mold may be provided on the outer circumference of the magnetic marker 1. The protective layer 12 formed by a resin mold may be a mold layer made of a composite material reinforced by glass fiber or the like. Furthermore, an RFID tag may be laminated on the front side or back side of the magnetic marker 1.

Examples of methods for fixing a sheet magnetic marker onto the road surface 53 include adhesive bonding using a material having an adhesive function and the like, a method for fixing by driving a pin or the like into the road surface 53, and the like. The shape of the magnetic marker 1 may be a polygonal shape such as a triangle, a quadrangle, or a hexagon instead of a circular shape, may be a rectangular shape, or may be a cross shape or the like obtained by crossing two rectangular shapes. Further, a magnetic material yet to be magnetized may be laminated on or applied to the top side of the road surface 53 in advance, and a magnetic marker which is equivalent to that of Embodiment 5 may be formed by magnetizing a predetermined range. For example, a line to which a paint containing a magnetic material has been applied may be provided along the center of a lane, and then a predetermined position of the line may be magnetized.

For example, as for a highway of which durability is required, a road on which snow-removal work is performed by a snow-removing vehicle, or the like, a method for laying a buried magnetic marker may be employed to secure durability. Meanwhile, in a place where boring is difficult because of structure, a passage in a building such as a parking tower where work that does damage to a road surface is not likely to be carried out, a place or operation where it is necessary to change or move places of installation, or the like, it is preferable to employ a magnetic marker laying method of placing (mounting) on a surface. A columnar magnetic marker is suitable to laying method of burying, and a sheet magnetic marker is suited to a laying method of placing (mounting) on a surface. Examples of operation and the like where it is necessary to change or move places of installation include a detour at the time of closure due to construction or the like, a guidepath 55 for avoiding a blocked place 550 on a lane 551 as depicted in FIG. 18, and the like. A laying method by which to install a sheet magnetic marker 1 on a surface makes it extremely easy to lay or remove it on a temporarily set detour or the like. It should be noted that a magnetic marker that is laid on a temporarily set detour or guidepath may have a different polarity from a permanently installed magnetic marker. This allows the vehicle side to easily distinguish it from the permanently installed magnetic marker and easily detect the temporary guidepath or the like.

While it is comparatively easy to provide a hole in an asphalt layer, the cost of providing a hole that reaches a layer of gravel or the like that constitutes a layer below the asphalt layer is high. Furthermore, if a magnetic marker is buried deeper than a depth at which a pavement is to be stripped at the time of repair work on a paved surface, there is fear that a broken piece of the magnetic marker may remain after the time of repair work. To address this problem, the ratio of height to the size of a cross-section of the magnetic marker may be changed according to the thickness or the like of the asphalt layer, which varies according to the type of road such as a highway or a municipal road. Further, the ratio may be changed according to the durability, such as traffic volume, required of the magnetic marker.

As for the other configurations and working effects, Embodiment 5 is the same as the other embodiments.

While the specific examples of the present invention have been described above in detail as in the above embodiments, these specific examples merely describe examples of technologies included in the claims. Needless to say, the claims should not be restrictively construed by the structures, numerical values, and so forth of the specific examples. The claims include technologies obtained by variously modifying, changing, and combining the specific examples as appropriate by using known technologies, knowledge, and so forth by people skilled in the art.

DESCRIPTION OF SYMBOLS

1 magnetic marker
1S marker system
15 RFID tag (information providing part)
2 magnetic sensor
21 MI element
211 amorphous wire (magneto-sensitive body)
213 pickup coil
3 tag reader
5 vehicle
50 vehicle body floor (bottom surface)
53 road surface
530 hole

The invention claimed is:

1. A marker system, comprising:
a plurality of types of magnetic markers having different ratios of height to a size of a cross-section, the plurality of types of the magnetic markers including at least a sheet magnetic marker disposed on a surface of a road, or a columnar magnetic marker inserted in the road so as to be detectable by a magnetic sensor of a vehicle and used for vehicle-side drive assist control for assisting driving, wherein
each of the plurality of types of the magnetic markers includes a magnet that contains a magnetic powder that is a powder of a magnetic material, and
each of the different ratios of the magnetic markers is changed according to either a thickness of an asphalt layer constituting a road surface or traffic volume.

2. The marker system according to claim 1, wherein the magnetic marker is a magnet having a magnetic flux density of 45 mT or lower of a surface thereof.

3. The marker system according to claim 2, wherein the magnet is provided with a retaining structure for preventing the magnetic marker from being removed in a pull-out direction when accommodated in a hole.

4. The marker system according to claim 1, wherein the magnetic powder is a magnetic powder of iron oxide.

5. The marker system according to claim 4, wherein the magnet is a molded article having the magnetic powder dispersed in a polymer material constituting a base material.

6. The marker system according to claim 5, wherein the polymer material is asphalt.

7. The marker system according to claim 1, wherein the magnet is a molded article having the magnetic powder dispersed in a polymer material constituting a base material.

8. The marker system according to claim 7, wherein the polymer material is asphalt.

9. The marker system according to claim 1, wherein the magnetic marker is a columnar magnet measuring 50 mm or smaller in diameter.

10. The marker system according to claim 1, wherein the magnet is provided with a retaining structure for preventing the magnetic marker from being removed in a pull-out direction when accommodated in a hole.

11. The marker system according to claim 1, wherein the magnetic marker has an outer circumferential surface all or a part of which is formed by a protective layer including at least fiber.

12. The marker system according to claim 1, wherein the magnet holds an information providing part that provides a vehicle side with information by radio communication.

13. The marker system according to claim 12, wherein the information providing part provides the vehicle side with height-indicating information by radio communication.

14. The marker system according to claim 1, wherein the columnar magnetic marker is laid in a state of being accommodated in a hole bored in a road surface.

15. The marker system according to claim 14, wherein the columnar magnetic marker is accommodated in the hole in a state of being recessed from the road surface, and a lid is fitted in the hole.

16. The marker system according to claim 15, wherein the lid is a lid made of a paving material.

17. The marker system according to claim 15, wherein the lid is a lid made of metal or resin and is fitted in the hole so as to serve as a mark for a laying place of the magnetic marker.

18. A marker system, comprising:
a plurality of types of magnetic markers, including at least a sheet magnetic marker disposed on a surface of a road, and a columnar magnetic marker inserted in the road, so as to be detectable by a magnetic sensor of a vehicle and used for vehicle-side drive assist control for assisting driving, wherein each of the plurality of types of the magnetic markers includes a magnet that contains a magnetic powder that is a powder of a magnetic material, and the plurality of types of the magnetic marker are combined so as to be different in ratio of height to a size of a cross-section and in magnetic flux density of a surface thereof and so as to be equal in magnetic flux density at an upper-limit height in a possible range of heights of attachment of the magnetic sensor in the vehicle.

19. A marker system, comprising:

a plurality of types of magnetic markers, including at least a sheet magnetic marker disposed on a surface of a road, or a columnar magnetic marker inserted in the road, so as to be detectable by a magnetic sensor of a vehicle and used for vehicle-side drive assist control for assisting driving, wherein the sheet magnetic marker includes a magnet formed into a sheet shape and containing a magnetic powder that is a powder of a magnetic material, the columnar magnetic marker includes a magnet molded into a columnar shape and containing a magnetic powder that is a powder of a magnetic material, the sheet magnetic marker is disposed on the surface of the road of a detour temporarily set to avoid entry of the vehicle into a region into which entry is temporarily restricted or a guidepath temporarily set so as to guide the vehicle, and the columnar magnetic marker is permanently inserted in the road.

20. The marker system according to claim 19, wherein the sheet magnetic marker that is disposed on the surface of the road of the detour or guidepath temporarily set and the columnar magnetic marker that is permanently inserted in the road have different polarities so as to be distinguishable on a vehicle side.

\* \* \* \* \*